(12) United States Patent
Lee

(10) Patent No.: US 7,885,400 B2
(45) Date of Patent: *Feb. 8, 2011

(54) CALL FEATURES FOR AUTOMATIC CALL DISTRIBUTION SYSTEM

(75) Inventor: Michael C. G. Lee, Ottawa (CA)

(73) Assignee: Mortel Networks Limited, Mississauga, Ontario (CA)

( * ) Notice: Subject to any disclaimer, the term of this patent is extended or adjusted under 35 U.S.C. 154(b) by 478 days.

This patent is subject to a terminal disclaimer.

(21) Appl. No.: 11/827,142

(22) Filed: Jul. 10, 2007

(65) Prior Publication Data

US 2008/0089508 A1    Apr. 17, 2008

Related U.S. Application Data

(63) Continuation of application No. 09/472,910, filed on Dec. 27, 1999, now Pat. No. 7,257,217.

(51) Int. Cl.
H04M 3/00 (2006.01)
H04M 5/00 (2006.01)

(52) U.S. Cl. ............... 379/265.01; 379/265.02; 379/265.06; 379/265.07; 379/265.08; 379/265.09; 379/265.11; 379/266.01

(58) Field of Classification Search ......... 379/265.01, 379/265.02, 265.06, 265.07, 265.08, 265.09, 379/265.11, 266.01
See application file for complete search history.

(56) References Cited

U.S. PATENT DOCUMENTS

| 5,327,486 | A | 7/1994 | Wolff et al. |
| 5,436,967 | A | 7/1995 | Hanson |
| 5,764,746 | A | 6/1998 | Reichelt |
| 5,884,032 | A | 3/1999 | Bateman et al. |
| 5,991,394 | A | 11/1999 | Dezonno et al. |
| 6,011,845 | A * | 1/2000 | Nabkel et al. ......... 379/266.01 |
| 6,046,762 | A | 4/2000 | Sonesh et al. |
| 6,195,418 | B1 * | 2/2001 | Ridgley ................. 379/88.23 |
| 6,295,354 | B1 | 9/2001 | Dezonno |
| 6,301,354 | B1 | 10/2001 | Walker et al. |
| 6,314,177 | B1 | 11/2001 | Davis et al. |
| 2005/0048969 | A1 | 3/2005 | Shaheen et al. |

FOREIGN PATENT DOCUMENTS

EP    0 866 407    9/1998

OTHER PUBLICATIONS

Newton's Telecom Dictionary by Harry Newton, 8th Expanded & Up dated Edition, pp. 950, Nov. 1994.
Harry Newton, Newton's Telecom Dictionary, 8th Edition, Nov. 1994, pp. 501.
PCT/US98/06859 Shaheen et al., Wireless communication system that supports multiple standards, protocol and extended services, publication date Oct. 15, 1998.

* cited by examiner

Primary Examiner—Quynh H Nguyen

(57) ABSTRACT

Call features for an Automatic Call Distribution (ACD) system implemented within a packet-based telephone environment are disclosed. Within a packet-based network, data messages are transferred between the ACD system and customer telephone stations while the customer waits for an attendant to become available. These data messages allow the customer to be informed of his/her current status within the priority order and further allows the customer to initiate a number of customer oriented operations. These operations include selecting music to listen to while waiting, requesting to be alerted when an attendant becomes available, and initiating a browser session for accessing data information. Overall, the status reports in combination with the initiating of one or more of the customer oriented operations can make the time spent waiting for an attendant a more productive and pleasant experience for the customer.

16 Claims, 11 Drawing Sheets

CALL FEATURES FOR AUTOMATIC CALL DISTRIBUTION SYSTEM

CROSS-REFERENCE TO RELATED APPLICATION(S)

This application is a continuation of prior application Ser. No. 09/472,910 filed on Dec. 27, 1999 now U.S. Pat. No. 7,257,217, and which is incorporated herein by reference.

FIELD OF THE INVENTION

This invention relates generally to automatic call distribution systems and, in particular, to apparatus and methods used to implement call features for automatic call distribution systems.

BACKGROUND OF THE INVENTION

The use of Automatic Call Distribution (ACD) systems has become a standard practise among corporations that rely upon telephone networks to interface with customers. The primary operation of ACD systems is to answer customer calls and distribute such calls to attendants as the attendants become available. Such ACD systems are currently being used to control customer support lines, fast food delivery operations, airline/train reservation services and 1-800 telephone number sales operations, to name only a few implementations.

FIG. 1 is a high level block diagram illustrating a standard telephony network 20 coupled to a well-known ACD controller 22 and a plurality of remote telephone stations 24. As depicted, the ACD controller 22 is further coupled to a memory storage device 26 and a plurality of attendant telephone stations 28. The ACD controller 22, the memory storage device 26 and the attendant telephone stations 28 together can be referred to as an ACD system, the components of the ACD system typically being located together at an ACD center 30.

In well-known implementations, the ACD controller 22 is built upon a Private Branch Exchange (PBX) device with specialized software implemented to create the ACD functionality. This PBX device may be an analog device, but is more commonly a digital PBX device such as a Meridian M1 PBX produced by Nortel Networks Corporation of Brampton, Ontario, Canada. The ACD controller 22 is coupled to the telephony network 20 via a number of analog telephone lines, or optionally in a digital fashion via high speed interconnections such as T1 telephone lines.

The attendant telephone stations 28 comprise telephone handsets or headsets to communicate with customers at the remote telephone stations 24. Further, the attendants typically also have computer terminals (not shown) in order to take orders and/or information from the customers. The remote telephone stations 24, on the other hand, can be standard analog telephones coupled to the telephony network 20 directly, digital telephones coupled to the telephony network 20 via their own PBX system, or even wireless telephones coupled to wireless telephony networks.

In normal operation, the well-known ACD controller 22 answers call requests from customers at the remote telephone stations 24, determines if an attendant is available to answer the call from the customer, connects the call to the attendant if one is available and, if an attendant is not currently available, informs the customer of this fact. Informing the customer that no attendant is currently available to take the call can be done in a number of ways but commonly includes playing a recorded voice message followed by the playing of music. After informing the customer that no attendant is currently available, the ACD controller 22 next puts the answered calls in a priority order based upon the order they were answered and forwards each call to an attendant as the attendants become available.

One key advantage for a corporation using the ACD controller 22 is the flexibility that such a system provides. A corporation can schedule a set number of attendants to work during a set period of time without having to worry about the demand for their attendants exceeding the number working. The ACD controller 22 can compensate for access demand for the attendants during a particular period by answering the calls from the customers and essentially putting the call on hold until an attendant is available.

The key problem with the ACD controllers as currently designed is the waiting time that they cause on the part of the customers calling into the ACD systems. In some circumstances, a remote telephone station 24 could remain in an active telephone session with the ACD controller 22 for a long period of time before the ACD controller 22 forwards the call to one of the attendant telephone stations 28. This can result in dissatisfaction on the part of the customer as the customer must stay on the line to maintain his/her place within the priority order, essentially forcing the user to keep his/her ear glued to the telephone handset to wait for the attendant. Using handsfree operation can help, but the user must still remain within a close proximity to the remote telephone station 24. Further, this results in the customer's telephone line being left in an active state during which time the customer is prevented from receiving and initiating telephone sessions.

To productively utilize this waiting time, many well-known ACD controllers offer customers a number of options to select from prior to the call being forwarded to an attendant. In these implementations, the ACD controller 22 plays a recorded voice message to the customer, the recorded voice message providing the options to be selected from and the telephone keys that the customer must press to select each option. For example, this recorded voice message could specify that the pressing of digit "1" indicates "English service" while the pressing of digit "2" indicates "French service". Further, in another example in which the attendants organize travel arrangements, the recorded voice message could specify that the pressing of certain telephone keys indicates the customer's desire to travel to specific destination cities.

After receiving the recorded voice message from the ACD controller 22, the customer can subsequently select one of the options by pressing the corresponding telephone keys; the pressing of the telephone keys resulting in Dual Tone Multi-Frequency (DTMF) signals being sent to the ACD controller 22 from the customer's remote telephone station 24. The ACD controller 22 receives these DTMF signals and proceeds to process the call taking into consideration the customers selections. This processing of the call could include sending additional recorded voice messages to the customer that provide additional options to select from, sending additional recorded voice messages to the customer that provide information corresponding to the customer's previous selection and/or sending the options selected by the customer to the attendant the call is eventually directed to. Overall, this type of interactive communication system is generally referred to as an Integrated Voice Response (IVR) system.

Despite the improvements made with the use of IVR, traditional ACD systems still require a customer to maintain a telephone connection with the ACD controller and wait for service from an attendant. Further, typical IVR systems only allow for a limited amount of information to be provided to the customer, this information being restricted to data that has previously been audibly recorded and has been set-up to be selected via the telephone keys. Other information outside the scope of the audibly recorded data cannot be provided. Yet further, the user of these IVR systems can often get confused with too many voice prompt options and/or end up going around in circles through menus while trying to locate a particular piece of information. Even further, these IVR systems can be slow for the user to navigate and get the desired information.

SUMMARY OF THE INVENTION

Preferred embodiments of the present invention are directed to call features for an Automatic Call Distribution (ACD) system implemented within a packet-based telephone environment. Within these preferred embodiments, data messages are transferred between the ACD system and customer telephone stations while the customer waits for an attendant to become available. These data messages allow the customer to be informed of his/her current status within the priority order and further allow the customer to initiate a number of customer oriented operations. These operations preferably include selecting music to listen to while waiting, requesting to be alerted when an attendant becomes available, and initiating a browser session for accessing data information. Overall, the status reports in combination with the initiating of one or more of the customer oriented operations can make the time spent waiting for an attendant a more productive and pleasant experience for the customer.

The present invention, according to a first broad aspect, is an Automatic Call Distribution (ACD) controller arranged to be coupled through a packet-based network to a plurality of remote telephone stations and one or more attendant telephone stations. The ACD controller includes call reception logic that controls the establishment of telephone sessions between the remote telephone stations and the attendant telephone stations. First, the call reception logic receives call initiation signals from a particular one of the remote telephone stations and subsequently monitors if an attendant availability parameter is met. If the attendant availability parameter is not met, the call reception logic proceeds to send a data information message to the particular remote telephone station via the packet-based network. On the other hand, if the attendant availability parameter is met, the call reception logic proceeds to establish an audio channel between the particular remote telephone station and a particular one of the attendant telephone stations.

In preferred embodiments, the call reception logic further queries the capabilities of the particular remote telephone station prior to sending the data information message; the capabilities determining the format for the data information message. Yet further, the call reception logic preferably determines a waiting parameter to be presented to a user at the particular remote telephone station, the data information message including this waiting parameter. In some embodiments, the waiting parameter is a priority order number and/ or an estimation of the time before the attendant availability parameter will be met. In even further preferred embodiments, the data information message includes an alert request option, a plurality of audio options, and/or a browser request option. These options allow for the user at the remote telephone station to initiate a variety of operations to be performed while waiting for the attendant availability parameter to be met.

The present invention, according to a second broad aspect, is an ACD controller similar to the ACD controller of the first broad aspect, but with a modified call reception logic. In this aspect, the call reception logic receives call initiation signals from a particular one of the remote telephone stations and subsequently initiates a browser session with the particular remote telephone station such that the particular remote telephone station can access data information within a browser format. Next, the call reception logic monitors for receipt of an attendant request message being sent from the particular remote telephone station. If an attendant request message is received, the call reception logic monitors if an attendant availability parameter is met. If the attendant availability parameter is met, the call reception logic establishes an audio channel between the particular remote telephone station and a particular one of the attendant telephone stations.

The present invention, according to a third broad aspect, is a switching device arranged to be coupled through a telephone network to a remote telephone station and an ACD system that includes an attendant telephone station. In this aspect, the switching device includes alert request logic that is operable when the remote telephone station is connected to the ACD system through the switching device. The alert request logic operates to monitor for receipt of an alert request activation signal. If the alert request activation signal is received, the alert request logic stores a directory number corresponding to the remote telephone station, disconnects the remote telephone station from the switching device and monitor for an attendant ready signal from the ACD system. If the attendant ready signal is received, the alert request logic proceeds to initiate a telephone session with the remote telephone station using the stored directory number in order to connect the remote telephone station and the ACD system.

The present invention, according to a fourth broad aspect, is a telephone station arranged to be coupled through a telephone network to an Automatic Call Distribution (ACD) system comprising at least one attendant telephone station. The telephone station includes alert request logic that is operable when the telephone station is connected to the ACD system. In this aspect, the alert request logic monitors for receipt of an alert request activation signal. If the alert request activation signal is received, the alert request logic periodically sends a recorded voice message to the ACD system indicating how to send an attendant ready signal to the alert request logic, monitors for an attendant ready signal from the ACD system and, if the attendant ready signal is received, initiates a alert operation on the telephone station.

The present invention, according to another aspect, is an ACD system comprising an ACD controller according to the first broad aspect and a number of attendant telephone stations coupled to the ACD controller. In another aspect, the present invention is a telephone network comprising the ACD system of above, a packet-based network and one or more remote telephone stations. The present invention, according to even further aspects, is a method performed within an ACD controller of the first broad aspect and a method performed within a switching device of the third broad aspect.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

The preferred embodiment of the present invention is described with reference to the following figures, in which.

DETAILED DESCRIPTION OF THE PREFERRED EMBODIMENT

Preferred embodiments of the present invention are directed to ACD systems implemented within a packet-based environment. In these preferred embodiments, customers using packet-based telephone stations can send/receive both voice and data communications to/from the ACD system via a packet-based network which is preferably an Internet Protocol (IP) network. The combination of voice and data communications allows for additional ACD call features, as will be described herein below, to be implemented in the packet-based environment that would be difficult or impossible to be implemented in the traditional analog telephony environment.

Figure 2:
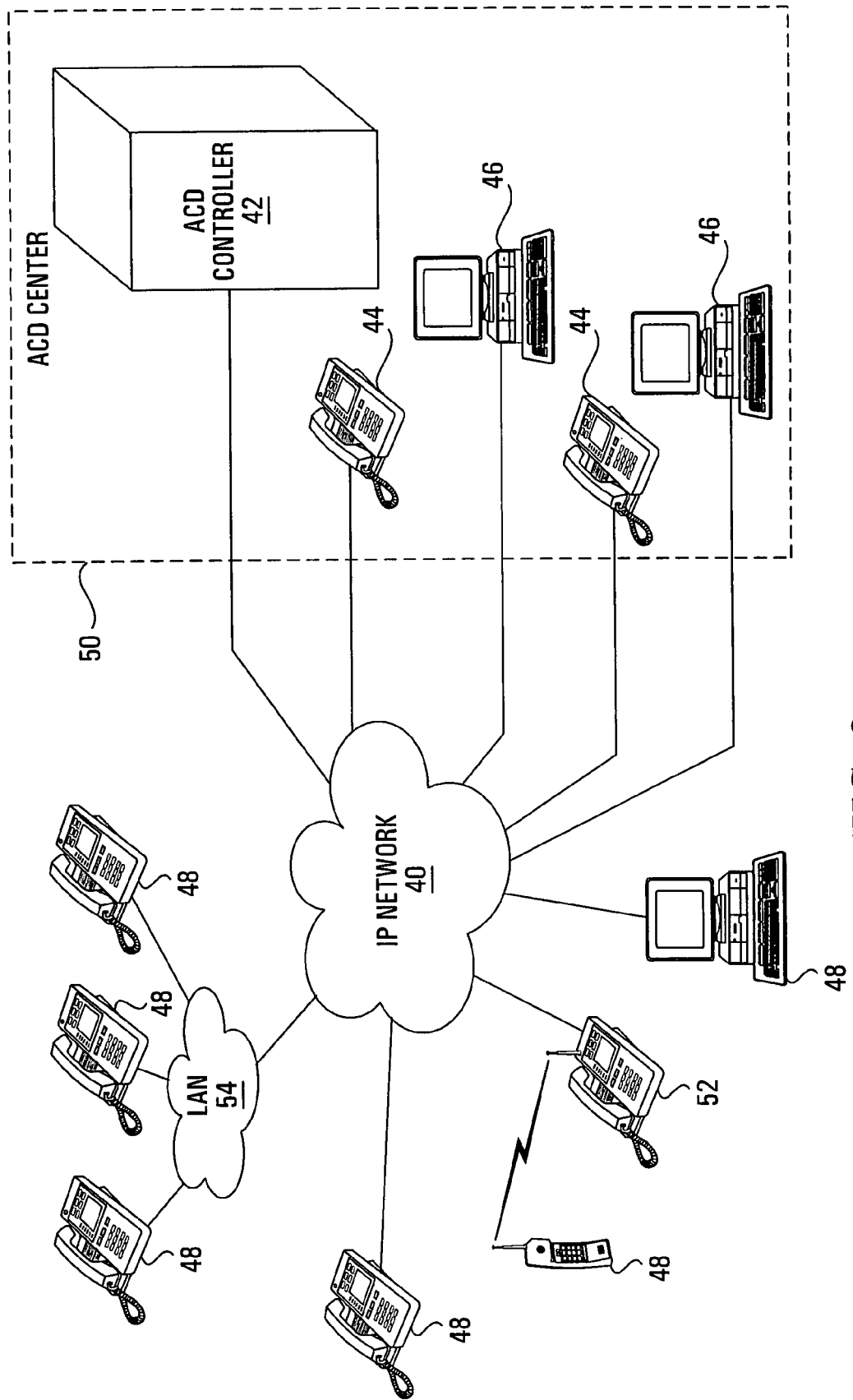
FIG. 2 is a high level block diagram of a packet-based network coupled to an ACD system according to a first preferred embodiment of the present invention.

FIG. 2 is a high level block diagram illustrating a packet-based network, in this case an IP network 40, coupled to an ACD system according to a first preferred embodiment of the present invention. As depicted, the IP network 40 is coupled to an ACD controller 42, a plurality of attendant telephone stations 44, a plurality of attendant console devices 46, and a variety of remote telephone stations 48 as will be described herein below. The components 42,44,46,48 coupled to the IP network 40 communicate with each other by sending data and/or voice within IP packets traversing the IP network 40, each of these components being addressed by a unique 32 bit IP address. The ACD controller 42, the attendant telephone stations 44 and the attendant console devices 46 can together be considered to comprise an ACD system in this situation.

Preferably, the IP network 40 is a managed IP network with sufficient quality of service (QoS) to provide real time voice services. For instance, IP networks within many enterprises currently have the necessary QoS for such voice services. Unfortunately, the public Internet presently does not provide satisfactory QoS for real time voice communications, though with lower quality standards such a network could still be utilized. The main impairments to real time voice communications are latency and packet loss, both of which are currently relatively high on the public Internet. As these problems are reduced in the future, it should be understood that the preferred embodiments of the present invention could be implemented within such a public Internet network. Hence, the preferred embodiments of the present invention should not be limited to a managed IP network.

The components of the ACD system, those being the ACD controller 42, the attendant telephone stations 44 and the attendant console devices 46, preferably are located at a central ACD center 50. Since, in the depicted situation, these components communicate through the IP network 40 which could span a large geographical area, alternative embodiments do not have the ACD controller 42, the attendant telephones 44 and the attendant console devices 46 located at a central location. In these alternative embodiments, the components could be divided into two or more sets of components, each set being located at a different location.

Whether the components are located at a central location or not, each attendant within the ACD system preferably has both an attendant telephone station 44 and an attendant console device 46, both devices being coupled to the IP network 40 by a physical interface connection such as an ethernet interface (not shown). The attendant telephone stations 44 are preferably one of an IP enabled telephone station, an IP enabled device with a headset, and an IP enabled telephone station with an analog headset attachment. The attendant console devices 46 are preferably a computing device, such as a personal computer, with specialized software or alternatively are dedicated hardware devices. It is further noted that an attendant telephone station 44 and an attendant console device 46 could, in some cases, be implemented together as a voice enabled personal computer running a soft client program, this personal computer having a microphone and speakers for this purpose.

Similar to the attendant telephone stations 44, the remote telephone stations 48 can take a number of forms. In the example illustrated in FIG. 2, the remote telephone stations 48 include an IP enabled telephone station coupled to the IP network through a high speed Digital Service Loop (DSL) line; a wireless IP enabled telephone station that communicates with a basestation 52 coupled to the IP network 40; a computing device, such as a personal computer with speakers and microphone, running an IP soft phone voice application program, the computing device coupled to the IP network 40 preferably via an ethernet interface (not shown); and a plurality of IP enabled telephone stations independently coupled to a Local Area Network (LAN) that is further coupled to the IP network 40. It should be understood that a remote telephone station utilized by a user to communicate with the ACD system according to preferred embodiments of the present invention should not be limited to the above described devices but could be any IP enabled device capable of voice and data communications.

The ACD controller 42 is preferably a workstation or personal computer with a Digital Signal Processing (DSP) card included. The ACD controller 42, according to these preferred embodiments of the present invention, will be described herein below with reference to FIG. 4 for the controller comprising a high performance personal computer with a DSP card. In alternative embodiments, the ACD controller 42 is a dedicated hardware device with specialized circuitry. In yet further alternatives, the ACD controller 42 could be a high end personal computer or workstation without a DSP card, the DSP algorithms being run on the main processor of the personal computer in this case. It is noted that this last alternative could reduce the number of calls the ACD controller 42 could handle when compared to the preferred case in which a DSP is included.

In operation, the ACD controller 42 acts as a control mechanism for the ACD system. IP voice calls initiated by a user at one of the remote telephone stations 48 are initially directed to and are subsequently controlled by the ACD controller 42. The initiation of an IP voice call in preferred embodiments is done by establishing a signaling channel between the remote telephone station 48 and the ACD controller 42 with use of one of several Voice over IP (VoIP) protocols. The description herein below will be with respect to the H.323 VoIP protocol defined by the International Telecommunications Union (ITU), although it should be recognized that other VoIP protocols are equally applicable. It should be noted that a VoIP telephone session between the ACD controller 42 and one of the remote telephone stations 48 requires the adherence to many different well-known protocols. The description of these protocols for preferred embodiments of the present invention will be described below with reference to FIG. 5.

Figure 3:
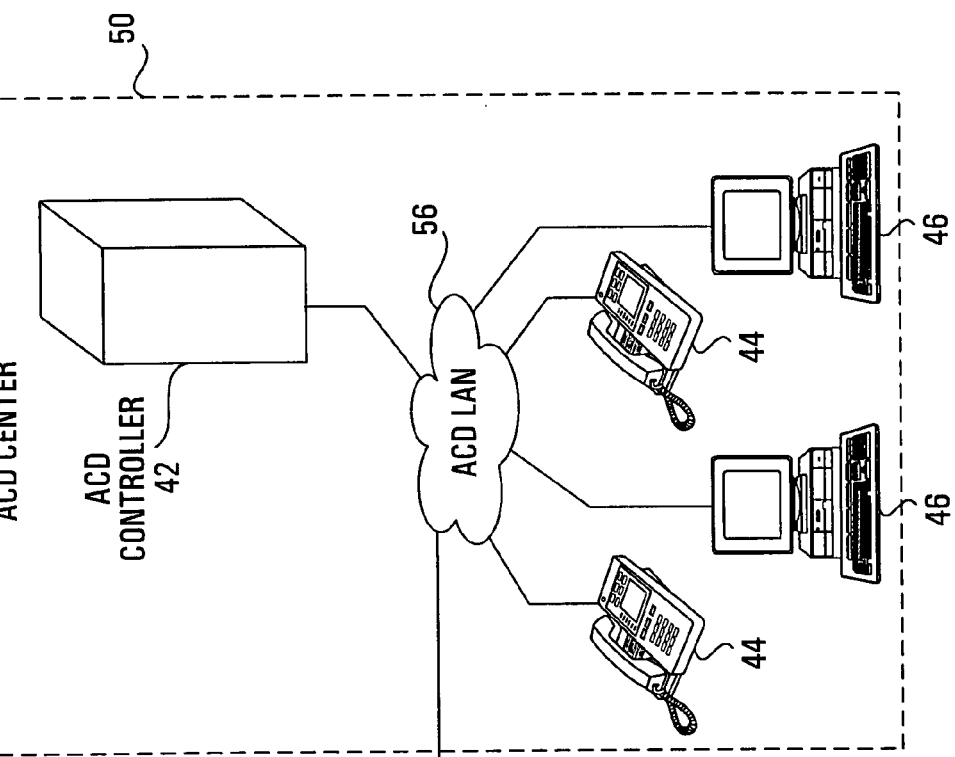
FIG. 3 is a high level block diagram of a packet-based network coupled to an ACD system according to a second preferred embodiment of the present invention.
Figure 3:
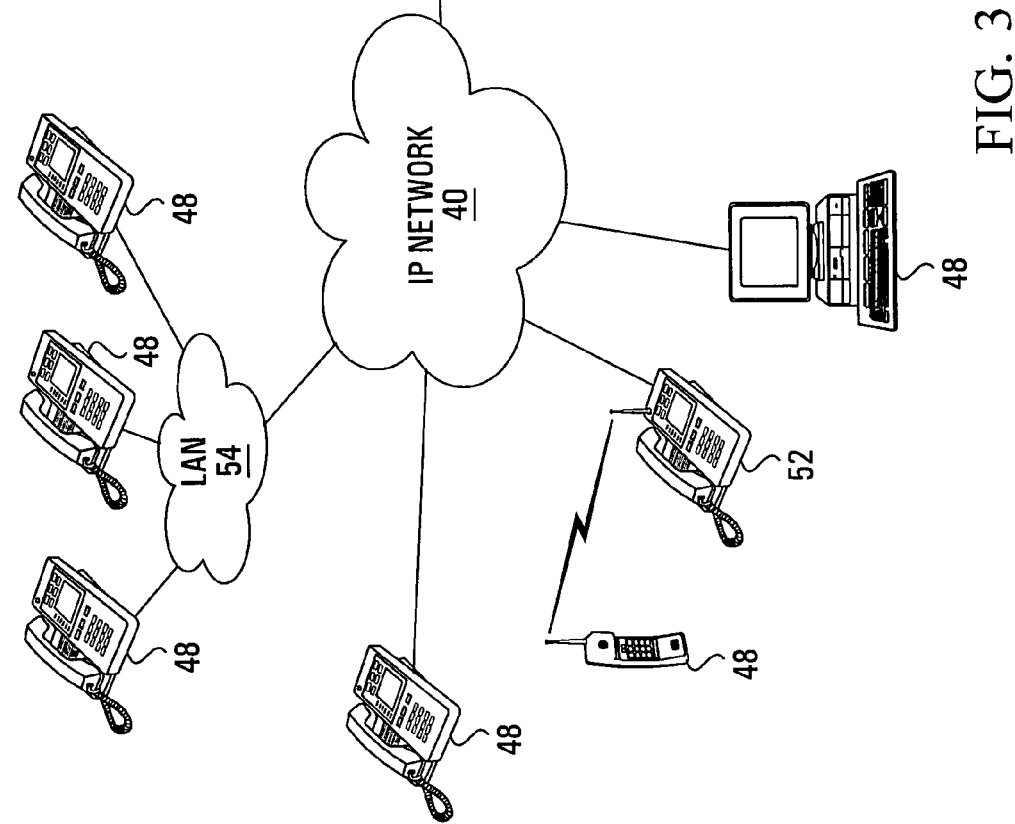

FIG. 3 is a high level block diagram similar to FIG. 2 but with the IP network 40 coupled to an ACD system according to a second preferred embodiment of the present invention. In this figure, all of the components are the same as those depicted in FIG. 2, but with a different configuration within the ACD center 50. In this case, an ACD LAN 56 is used to interconnect the ACD controller 42, the attendant telephone stations 44 and the attendant console devices 46. The LAN 56 is further coupled to the IP network 40 through a router or a firewall device (not shown). It should be understood that further embodiments that allow for communication between the ACD controller 42 and the remote telephone stations 48 are further possible while still being within the scope of the present invention.

Figure 4:
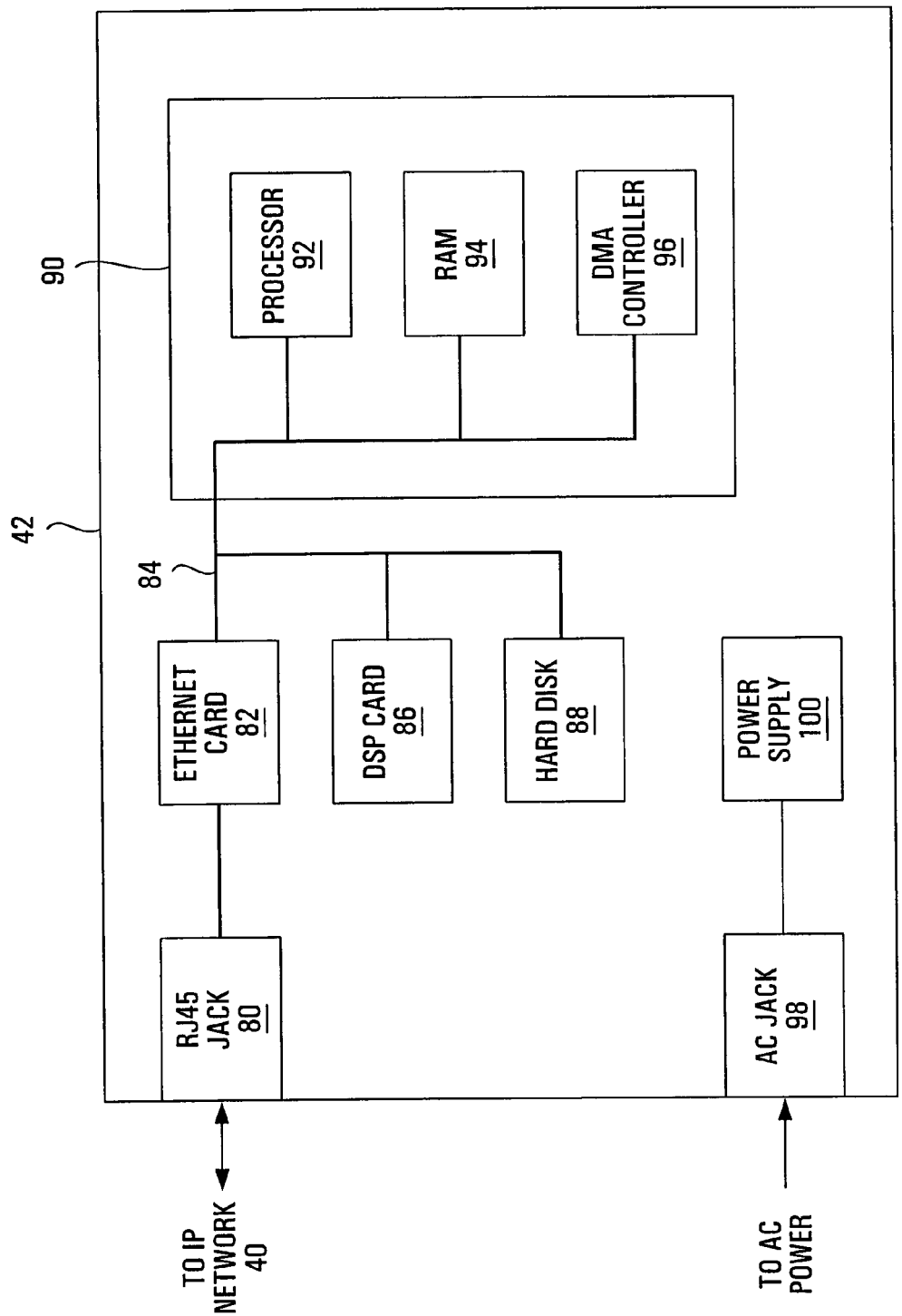
FIG. 4 is a block diagram of an ACD controller according to a preferred embodiment of the present invention.

FIG. 4 is a block diagram of the ACD controller 42 according to a preferred embodiment of the present invention. In this preferred embodiment, the ACD controller 42 is a modified high performance personal computer comprising an RJ45 jack 80 coupled to the IP network 40; an Ethernet card 82 coupled to the RJ45 jack 80; a high speed bus 84 coupled to the Ethernet card 82; and a DSP card 86, a hard disk drive 88 and a workstation motherboard 90 each coupled to the high speed bus 84. The motherboard 90, as depicted in FIG. 4, comprises a processor 92, a Random Access Memory (RAM) device 94 and a Direct Memory Access (DMA) controller 96. Further, the ACD controller 42 comprises an AC jack 98 coupled to a power supply 100 that powers the personal computer.

Within the ACD controller 42 of FIG. 4, the processor 92 in combination with the RAM 94 and the DMA controller 96 control and process all operations for the ACD controller 42 that do not require significant signal processing power. These operations include the processing of numerous packet software layers as will be described below with reference to FIG. 5, the running of software that performs call reception operations as will be described below with reference to FIG. 6, the storing and retrieving of data from the hard disk 88, the running of HyperText Transfer Protocol (HTTP) browser sessions with the remote telephone stations 48 as will be described below with reference to FIG. 9, and other normal functions for a personal computer to perform. The DSP card 86, on the other hand, performs operations that require large signal processing power such as voice coding and digital filtering of DTMF tones.

Figure 5:
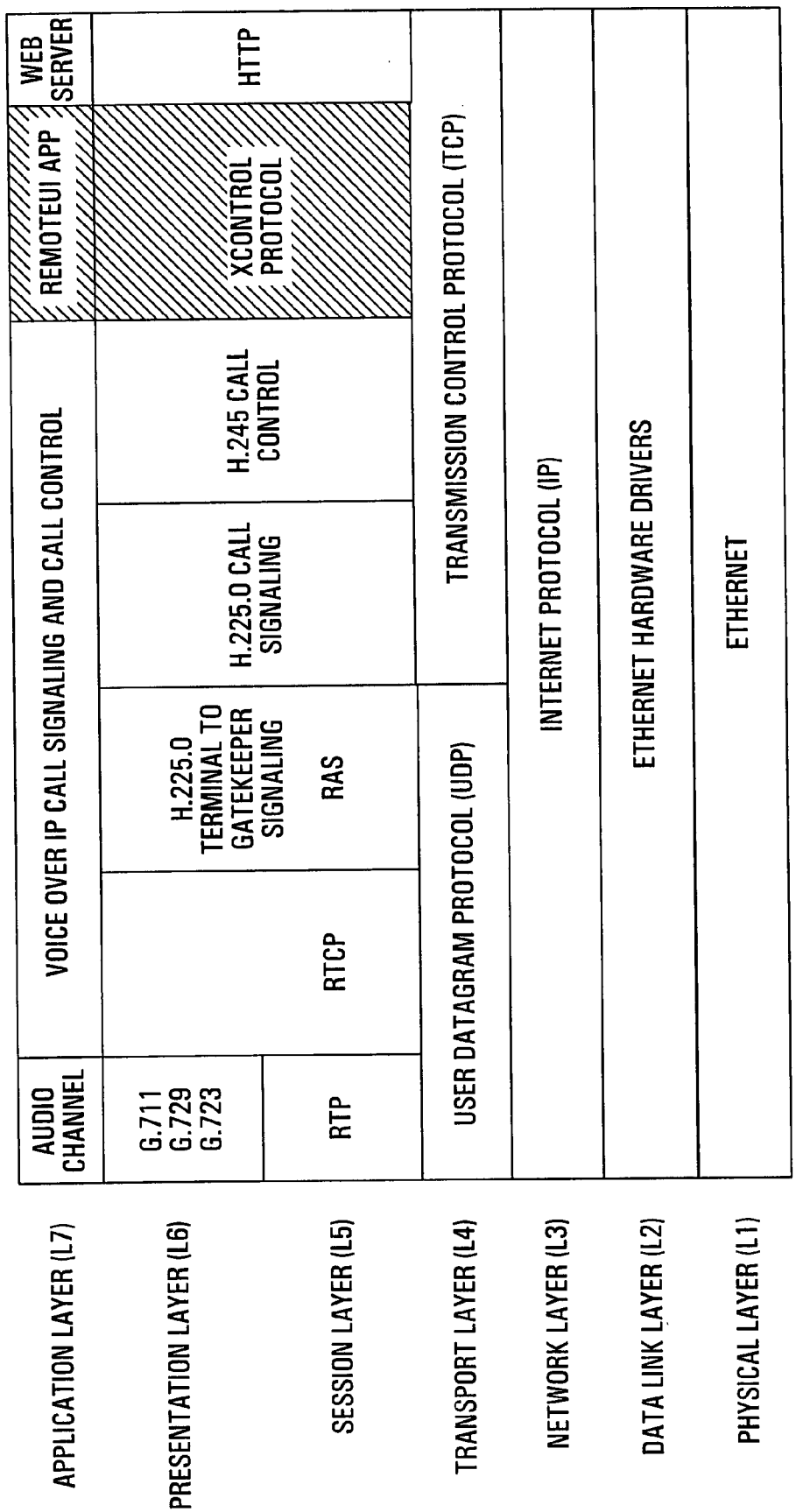
FIG. 5 is a software layers model illustrating the various protocol layers according to preferred embodiments of the present invention.

The software layers used to encapsulate data being sent between the ACD controller 42 and the remote telephone stations 48 are now described with reference to FIG. 5, along with a description concerning the components within the ACD controller 42 that preferably process these software layers. FIG. 5 illustrates an International Standards Organization (ISO) 7 level model of these software layers that has been modified for the implementation of preferred embodiments of the present invention.

As depicted in FIG. 5, the lowest layer, Layer 1 (L1), is preferably an Ethernet connection physical layer. Within FIG. 4, the Ethernet card 82 operates as an interface with this physical layer by stripping off the Ethernet header from incoming packets and adding an Ethernet header to packets being output from the ACD controller 42. The Ethernet card 82 acts under the control of the processor 92, this control being determined by the Ethernet hardware drivers which form the Data Link Layer 2 (L2) within FIG. 5.

It should be understood that the use of an Ethernet physical layer as an interface with the IP network 40 should not limit the scope of the present invention. For instance, other interfaces are possible with the IP network 40 such as Asynchronous Transfer Mode (ATM) interfaces, Token Ring Local Area Network (LAN) interfaces, Frame Relay interfaces, Digital Subscriber Line (DSL) interfaces, or other physical layer interfaces that can use the IP Layer 3 protocols. If different physical connections are used than Ethernet, Layers 1 and 2 of FIG. 5 would be correspondingly different and the Ethernet card 82 would be replaced with a different interface device within FIG. 4. The layers above the second layer are not affected by what the physical connection utilized is.

In the preferable model of FIG. 5, Layer 3 (L3) is the IP network layer, this network layer being standard to all IP networks. Further depicted within FIG. 5, Layer 4 (L4) consists of two transport layer services, those being User Datagram Protocol (UDP) and Transmission Control Protocol (TCP). A UDP layer provides a fast but non-guaranteed data delivery service based on a "best effort" to deliver packets. A TCP layer provides a slower but guaranteed delivery of packets, using retransmission for any lost or erroneous packets. Within the ACD controller 42 of FIG. 4, the processor 92 in combination with the RAM 94 and the DMA controller 96 interface with these network and transport layers. For the case of an incoming operation, the data packets output from the Ethernet card 82 are placed into the RAM 94 by the DMA controller 96 which is controlled by the processor 92. Subsequently, the processor 92 reads out the data packets from the RAM 94, processes them for the IP header of Layer 3, separates the packets between the UDP and TCP transport layer services of Layer 4 (L4) and processes the received data packets for their applicable one of these services. For the case of an outputting operation, the processor 92 attaches headers consistent with the Layer 3 and 4 services to data packets prior to forwarding them to the RAM 94. Next, the DMA controller 96 sends the data packets stored in the RAM 94 to the Ethernet card 86 for physical layer processing as described above.

Above Layer 4 (L4) are the higher level protocols of Layers 5, 6 and 7 (L5, L6, L7) which, in the case depicted in FIG. 5, provide an audio channel, VoIP call signaling and call control channels, a remote screen and softkey control channel according to preferred embodiments of the present invention, and a web server channel. Each of these higher level protocols, as are described herein below, have a different Layer 5 header which the processor 92 can utilize in order to separate the audio channel from the various signaling and control channels. The actual processing of these high level protocols is preferably performed by the processor 92 with the exception of the voice coding of the audio channel and digital filtering of DTMF tones from the audio channel that are preferably performed by the DSP card 86.

One of these higher level protocols of Layer 5 (L5) is the Real Time Protocol (RTP) which when combined with one of the Layer 6 (L6) voice coding protocols (G.711 that operates at 64 KB/sec, G.729 that operates at 8 KB/sec and G.723 that operates at either 6.4 or 5.6 KB/sec) can provide the voice or bearer audio channel. These L5 and L6 protocols run on top of UDP so there is no guarantee of packet delivery, however the service is fast which is required for real time audio transport. The best effort delivery of UDP is appropriate since there is no time for retransmission of data in the event of an error with real time voice information.

Other high level protocols of Layers 5 and 6 include the Real Time Control Protocol (RTCP) channel which provides supervision of the bearer audio channel; the H.225.0 Registration, Administration, Status (RAS) channel which is used for requesting admission onto a shared network from an "H.323 Gatekeeper" device on the network; and the H.225.0 Call Signaling and H.245 Call Control channels which provide call signaling and control respectively, such as call setup requests, alerting, capabilities exchange and other signaling.

Within preferred embodiments of the present invention, the high level protocols of FIG. 5 further include two new protocols, those being XControl and RemoteUIApp, which together provide a remote screen and softkey control channel. In essence, these protocols allow the ACD controller 42 to have remote control of, and interaction with, the display screen and softkeys within the remote telephone stations 48. The XControl protocol is a Layer 5 and 6 (L5, L6) level software that specifies the exact format of the display screen messages, softkey option label messages and softkey pressed control messages which can be exchanged between the ACD controller 42 and the remote telephone stations 48. The XControl protocol further specifies the headers and data content of these messages. The RemoteUIApp protocol is an Application Layer 7 (L7) level software which comprises the different display screen and softkey option label messages sent from the ACD controller 42 and the softkey button pressed control messages sent from the remote telephone station 48, assuming the remote telephone station 48 is a device utilizing softkeys. In other embodiments in which the remote telephone station 48 is a computing device running an IP soft client program, the RemoteUIApp protocol comprises mouse clicks and/or keyboard command messages sent from the remote telephone station 48.

The operation of the ACD controller 42 during a call reception operation according to preferred embodiments of the present invention is now described with reference to the flow chart of FIG. 6. This description is specific to the ACD system depicted in FIG. 2 though it could equally apply to the ACD system of FIG. 3 with some minor modifications as will be described herein below. It is noted that within the following description of the call reception operation of FIG. 6, only the higher level protocols of FIG. 5 are discussed since the processing of the lower level protocols of Layers 1 through 4 for each message being sent between the ACD controller 42 and a remote telephone station 48 are as described above with reference to FIG. 5.

Preferably, the steps described for this operation are performed by a software algorithm being run on the processor 92 within the ACD controller 42. It should be understood though that some or all of these functional steps could alternatively be performed with hard logic and/or discrete components. Hence, the steps of FIG. 6 will hereinafter be referred to as control logic being operated on the ACD controller 42.

Initially within the call reception operation, as depicted at step 120, the ACD controller 42 monitors for a call being initiated with the ACD system by a remote telephone station 48. The presence of a call initiation is confirmed by the ACD controller 42 if call setup messages are received from a remote telephone station 48, these call setup messages being contained within the H.225.0 call signaling channel that is processed by the processor 92. Once the ACD controller 42 detects the initiation of a call from a remote telephone station 48 with use of these call setup messages, the ACD controller 42 proceeds at step 122 to answer the call by sending other H.225.0 call signaling messages to the remote telephone station 48, these other H.225.0 call signaling messages being consistent with the H.323 VoIP standard.

Next, as depicted at step 124, the ACD controller 42 plays a greeting message stored within the hard disk 88 to the user at the remote telephone station 48 by sending voice data packet(s) containing such a voice message. This greeting preferably includes a welcome salutation that indicates to the user the corporation corresponding to the ACD system. The sending of the voice message to the remote telephone station 48 is preferably done by the DMA 96 forwarding a voice file containing the voice message from the hard disk 88 to the RAM 94 and subsequently forwarding the voice file to the DSP card 86. The DSP card 86 then performs transcoding on the voice file if it is not in the proper format for sending to the remote telephone station 48. Next, the DMA controller 96 forwards the voice file to the RAM 94 for lower layer processing by the processor 92 and eventual outputting to the remote telephone station 48.

At this point, the ACD controller 42 proceeds to query the remote telephone station's capabilities as depicted at step 126. The capabilities querying is a standard part of the H.323 protocol and is done by the H.245 call control protocol. In preferred embodiments of the present invention, a vendor specific area within the H.323 protocol is used to further query the capabilities of the remote telephone station 48 in terms of the size of the display screen, the number and configuration of buttons and softkeys, and whether the remote control of its display and softkeys is allowed. It is noted that other VoIP protocols have similar querying capabilities. In alternative embodiments, querying of the remote telephone station's capabilities is not performed, as such capabilities could either be indicated within the call setup messages or be predetermined based upon a universal standard.

Figure 6:
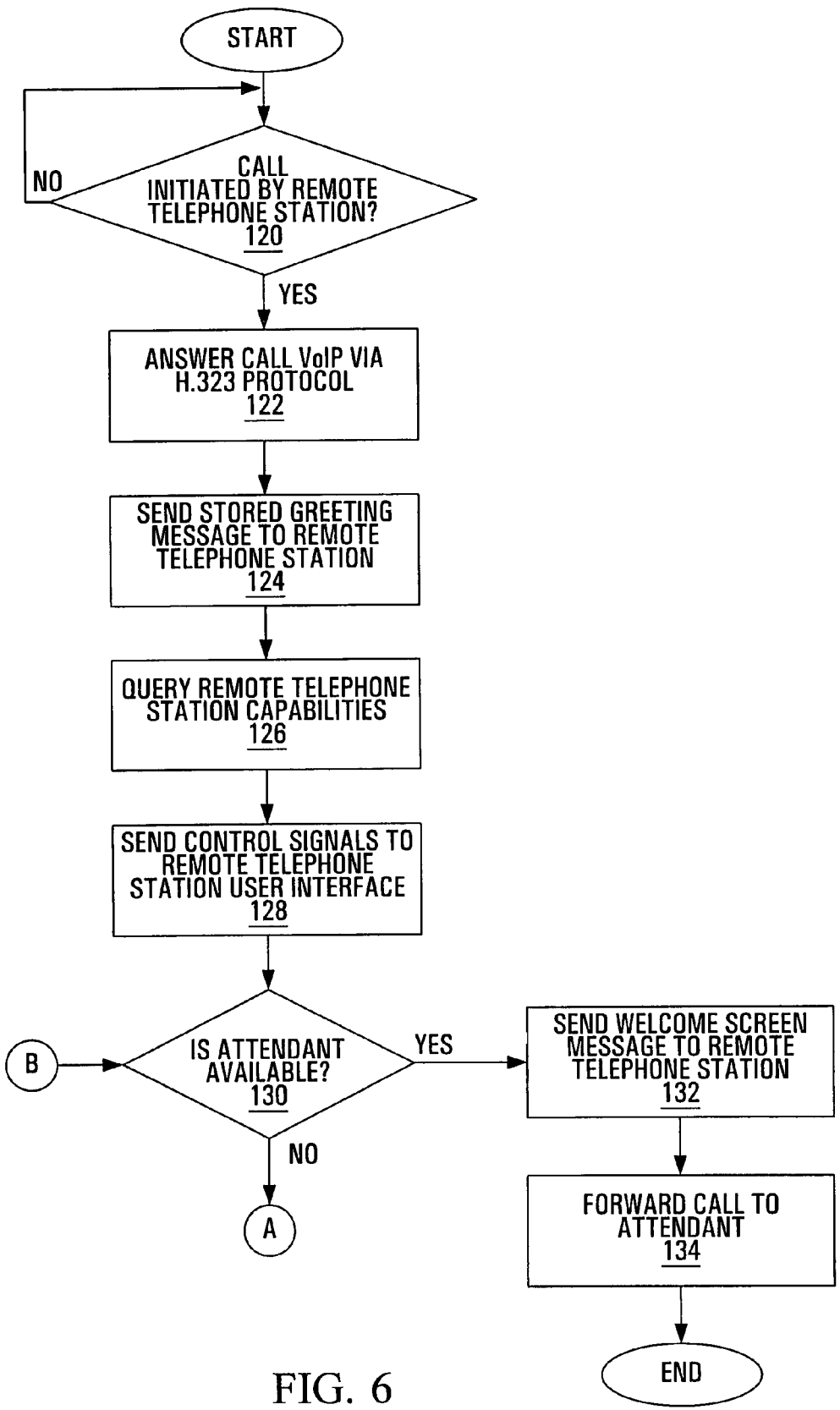
FIG. 6 is a flow chart illustrating the steps performed by the ACD controller within the ACD system of FIG. 2 during a call reception operation.
Figure 6:
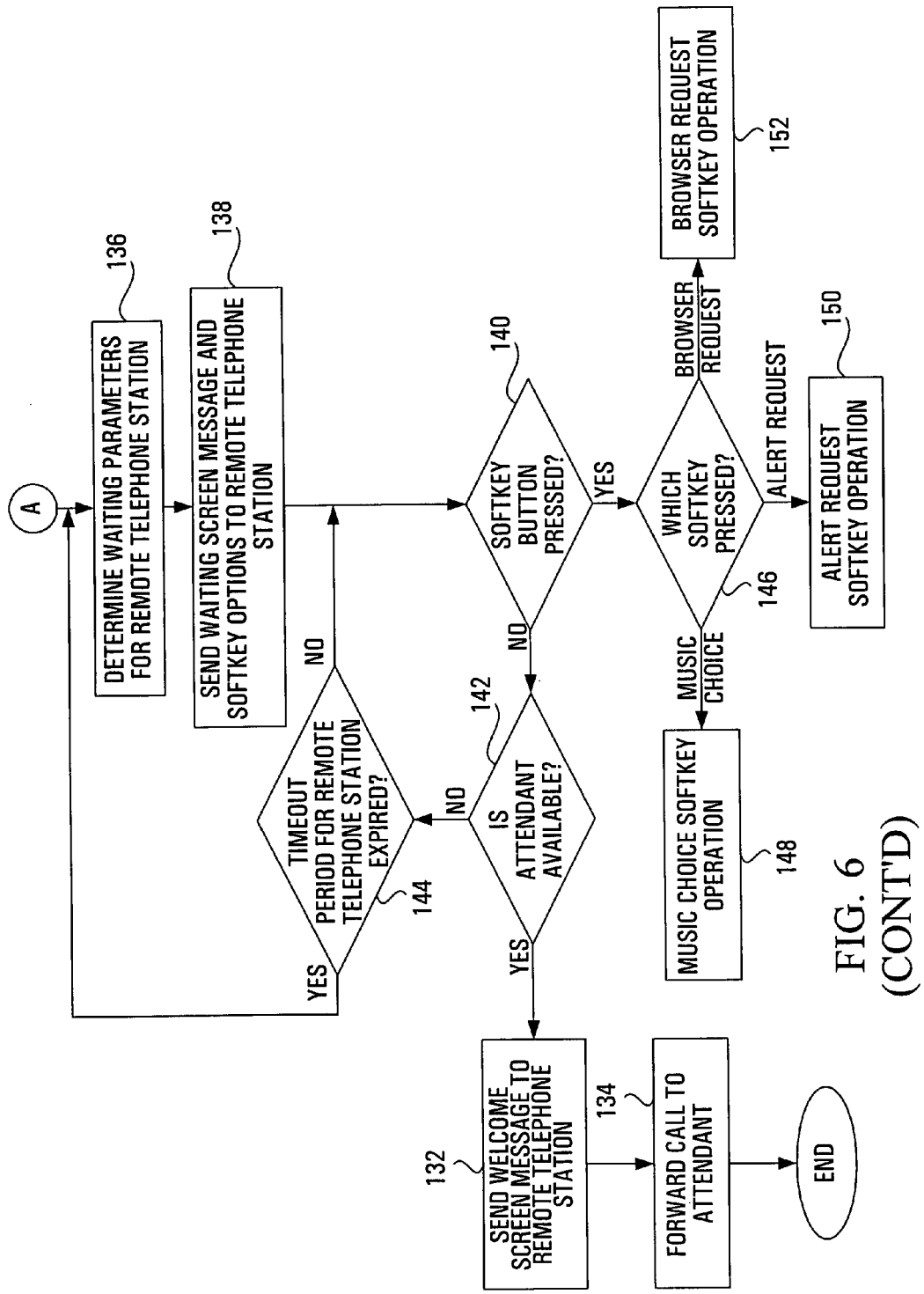
Figure 9:
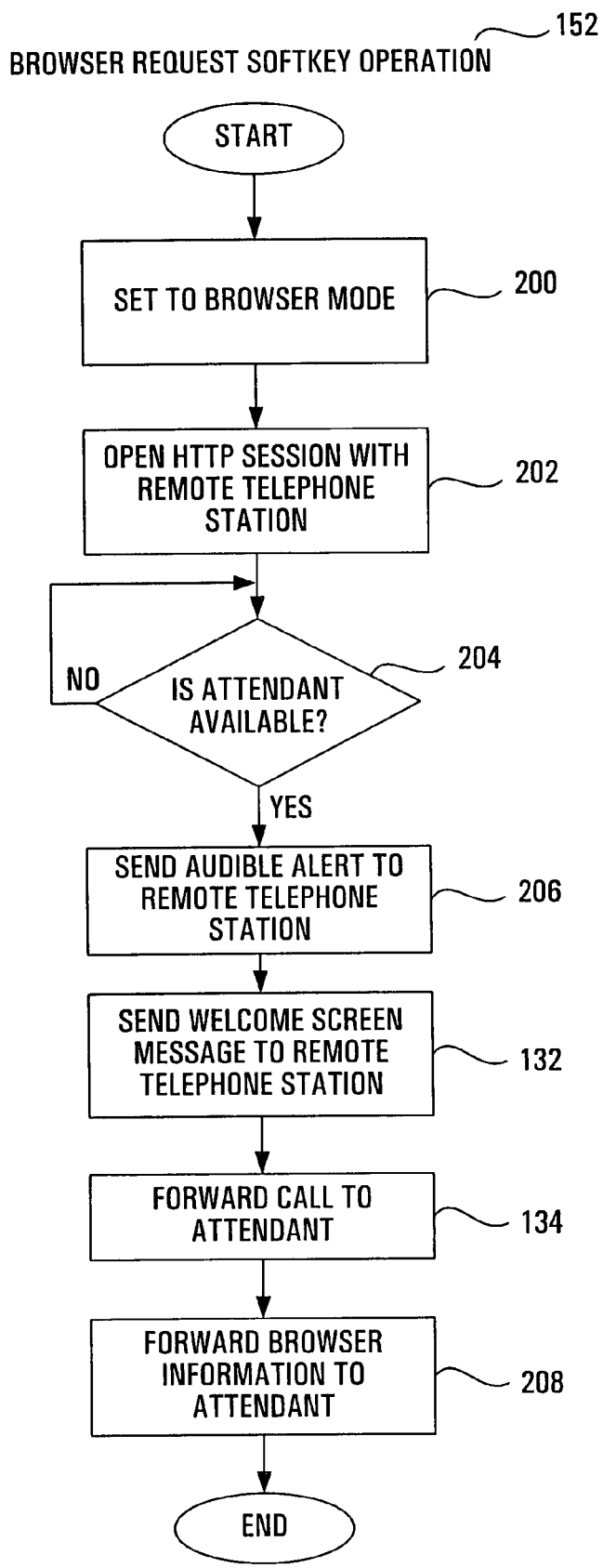
FIG. 9 is a flow chart illustrating the steps performed by the ACD controller within the ACD system of FIG. 2 during a browser request softkey operation.

It is noted that to continue in the call reception operation of FIG. 6, the capabilities of the remote telephone station 48 must be sufficient to support a minimum functionality and the ACD controller 42 must be allowed to take control of specific operations within the remote telephone station 48. The minimum functionality includes the installation of the new XControl and RemoteUIApp software as described above which enables the remote control of the remote telephone station 48, as well as some form of user interface. This user interface preferably comprises a display screen and softkeys. Further, if a web browser operation as is described below with reference to FIG. 9 is allowed, the remote telephone station 48 further must support the HTTP and have a browser application software installed.

As shown at step 128, the ACD controller 42 next sends control signals to the remote telephone station 48 indicating that the ACD controller 42 will control the user interfaces within the particular remote telephone station 48, the user interfaces preferably being the softkeys and display screen.

These control signals are preferably sent via the XControl and RemoteUIApp protocols as described above.

Subsequently, the ACD controller 42 determines whether an attendant is available for the user at the remote telephone station 48 at step 130. If an attendant is available, the processor 92 within the ACD controller 42 proceeds to perform the XControl and RemoteUIApp software in order to send a welcome screen message to the remote telephone station 48 that is to be displayed on the display screen at step 132. This welcome screen message preferably indicates that the call will be imminently answered by an attendant and possibly could provide information regarding the attendant, such as a name or identification number, and/or a selection of services the attendant can provide. Next, the call is forwarded to the available attendant at step 134. In the case that more than one attendant is available, the ACD controller 42 preferably performs a load balancing operation to ensure that each attendant answers approximately an even number of calls and/or is connected with customers for an approximately even amount of time.

If no attendant is available at step 130, the ACD controller 42 proceeds to determine waiting parameters for the remote telephone station 48 at step 136. These waiting parameters, according to preferred embodiments, include the number in which the particular remote telephone station 48 is within a priority order, the average length of time for a call, and the estimated wait time before an attendant will answer the call based upon the multiplication of the number of the call within the priority order and the average length of time for a call, divided by the number of attendants in the ACD system. In some embodiments, these waiting parameters are continuously updated with a rolling average length of time for a call being calculated. In other embodiments, the waiting parameters are only updated periodically. Next, as depicted at step 138, the ACD controller 42 performs the XControl and RemoteUIApp software in order to send a waiting screen message and softkey option labels to the remote telephone station 48. The waiting screen message includes the waiting parameters while the softkey option labels provide a selection of operations in which the remote telephone station 48 can operate while waiting for an attendant. These selection of operations according to preferred embodiments described below, comprise a music choice softkey operation in which the user can select a type of music to listen to while waiting, an alert request softkey operation in which the user can request to be alerted when an attendant is available, and a browser request softkey operation in which the user can peruse through data information with the use of a browser while waiting.

As depicted at step 140, the ACD controller 42 next determines if a softkey button is pressed by determining if a corresponding softkey pressed control message is received from the remote telephone station 48, this softkey pressed control message preferably being sent by the remote telephone station 48 with the XControl and RemoteUIApp software being run at the remote telephone station 48. If a softkey is not pressed, the ACD controller 42 determines if an attendant is available at step 142. If an attendant is available at this point, the ACD controller 42 proceeds to perform steps 132 and 134 described above for the establishment of the call with the attendant. If no attendant is available, the ACD controller 42 proceeds to determine at step 144 if a timeout period for updating the waiting parameters has expired for the remote telephone station 48. If the timeout period has not expired, the ACD controller returns to step 140 within the procedure. If the timeout period has expired, the ACD controller 42 updates the waiting parameters for the remote telephone station 48 by returning to step 136 within the procedure. Essentially, steps 140, 142, and 144 can be seen together as monitoring for one of a softkey button to be pressed, an attendant to become available, and a timeout period to expire. In alternative embodiments, no time out period is measured and instead steps 136 and 138 are regularly performed so as to continuously provide the user at the remote telephone station 48 up-to-date information.

If a softkey button is pressed at step 140, the ACD controller 42 proceeds to determine which of the softkey buttons is pressed at step 146. This is preferably done simply by reading the softkey pressed control message but alternatively could be performed with use of a query to the remote telephone station 48 with use of the XControl and RemoteUIApp software being run on the processor 92. Once the softkey that is pressed is determined, the ACD controller 42 proceeds to perform the operation corresponding to the label of the softkey pressed, those being the music choice softkey operation at step 148, the alert request softkey operation at step 150 or the browser request softkey operation at step 152. These operations 148, 150, 152 are now described in detail for preferred embodiments with reference to FIGS. 7, 8 and 9 respectively.

Figure 7:
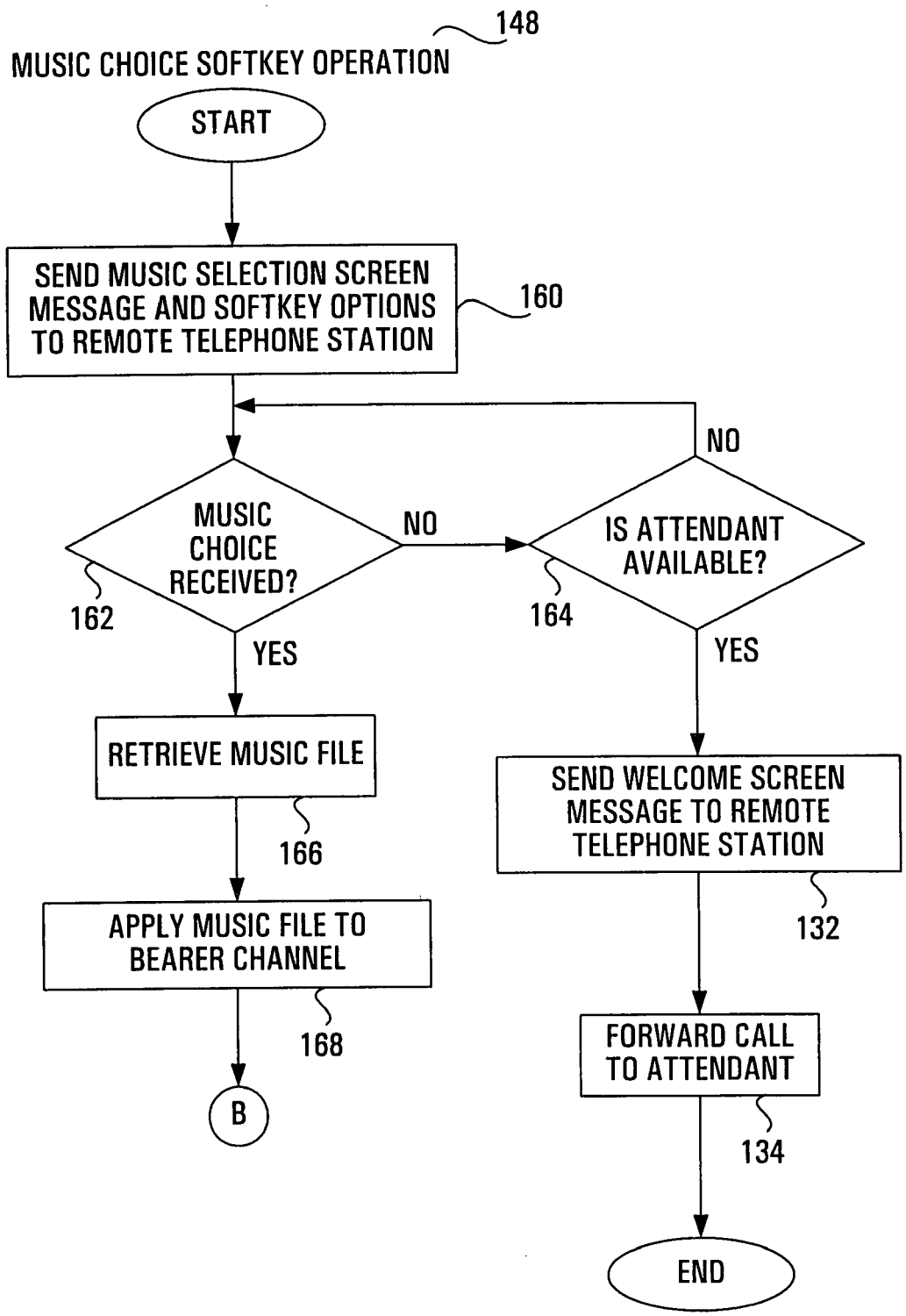
FIG. 7 is a flow chart illustrating the steps performed by the ACD controller within the ACD system of FIG. 2 during a music choice softkey operation.

FIG. 7 is a flow chart illustrating the steps performed by the ACD controller 42 during the music choice softkey operation 148 according to preferred embodiments. Firstly, the ACD controller 42 sends a music selection screen message and softkey option labels to the remote telephone station 160 as depicted at step 160, this screen message and softkey option labels being sent by the processor 92 with use of the XControl and RemoteUIApp software. The music selection screen message preferably presents a message asking for the user to select a particular type of music. The softkey option labels that are sent, in this case, provide a selection of music that is available such as "ROCK", "COUNTRY", and "LOUNGE".

Next, as depicted at steps 162 and 164, a softkey being pressed and the availability of an attendant respectively are monitored for. If an attendant is available at step 164, the ACD controller 42 proceeds to perform steps 132 and 134 described previously for the connection of the remote telephone station 48 to an attendant. If a softkey button is found to be pressed at step 162 by receiving a softkey pressed control message from the remote telephone station 48 running the XControl and RemoteUIApp software, the ACD controller 42 retrieves a music file from the hard disk 88 at step 166 that corresponds to the music type selected and applies the music file to the bearer channel between the ACD controller 42 and the remote telephone station 48 as depicted at step 168. The sending of a music file to the remote telephone station 48 is preferably done in the same manner as described above for the sending of the greeting message at step 124. In particular, the sending of the music file to the remote telephone station 48 is preferably done by the DMA 96 forwarding the music file from the hard disk 88 to the RAM 94 and subsequently forwarding the music file to the DSP card 86. The DSP card 86 then performs transcoding on the music file if it is not in the proper format for sending to the remote telephone station 48. Next, the DMA controller 96 forwards the music file to the RAM 94 for lower layer processing by the processor 92 and eventual application to the bearer channel and outputting to the remote telephone station 48.

Next, the ACD controller 42 returns to the monitoring for an attendant at step 130. Preferably, the ACD controller 42 continues to apply additional music files to the bearer channel until an attendant is available. In alternative embodiments, the user can select one of music types, specific music artists or songs, radio stations, and/or other audio entertainment selections such as news broadcasts and weather updates to be applied to the bearer channel.

Figure 8:
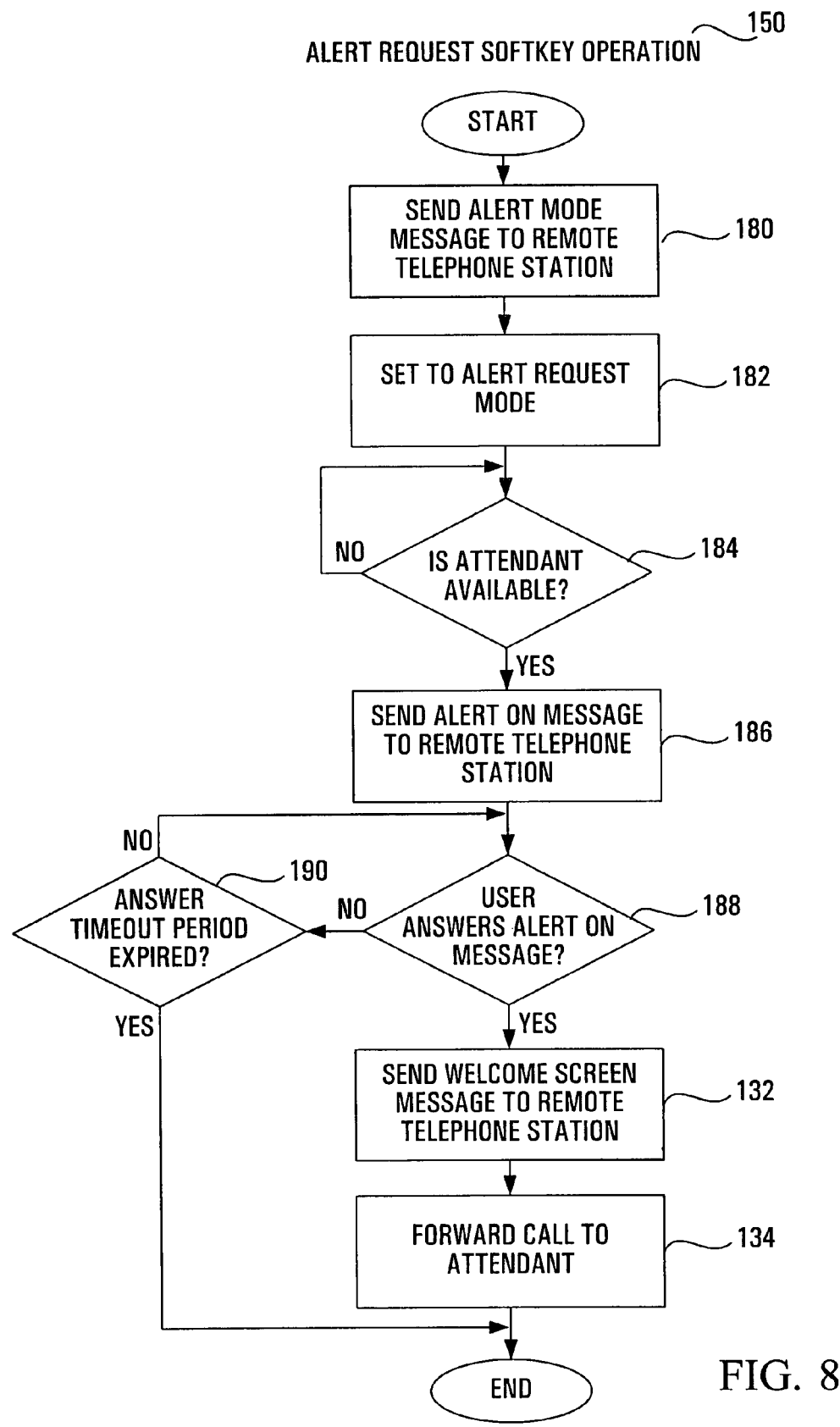
FIG. 8 is a flow chart illustrating the steps performed by the ACD controller within the ACD system of FIG. 2 during an alert request softkey operation.

FIG. 8 is a flow chart illustrating the steps performed by the ACD controller 42 during the alert request softkey operation 150 according to preferred embodiments of the present invention. Initially in this operation, the processor 92 within the ACD controller 42 sends an alert mode message to the remote telephone station 48 at step 180 with use of the XControl and RemoteUIApp software. This alert mode message indicates to the user that the remote telephone station 48 is now in alert mode and can proceed with normal operations, such as answering/initiating further telephone sessions, until an attendant is available. In preferred embodiments, the alert mode message results in the ACD controller 42 relinquishing partial control over the user interfaces within the remote telephone station 48 at step 180. In the preferred embodiments, the ACD controller 42 still maintains minimal control to provide updated waiting parameters, as described above, to the remote telephone station 48 as well as maintaining an alert mode icon on the remote telephone station 48. Next, at step 182, the ACD controller 42 sets itself into alert request mode for the particular call by attaching an alert flag to the particular call within the priority order and preferably ending further communications with the remote telephone station 48 until an attendant is available with the exception of the sending of waiting parameters as described above. At this point, the user of the remote telephone station is free to initiate/accept other telephone sessions.

Subsequently, the ACD controller 42 monitors for an attendant at step 184. Once an attendant is available, the ACD controller 42 preferably reacquires full control of the remote telephone station's user interfaces and sends at step 186 an alert on message to the remote telephone station 48. This alert on message, that is sent by the processor 92 with use of the XControl and RemoteUIApp software, preferably results in the ringing of the remote telephone station 48 with a unique ring tone and the displaying of an alert message on the display screen of the remote telephone station 48. Preferably, the ringing of the remote telephone station includes an automatic increase in volume for the ring tone to a maximum level, if not already set to such a level. Alternatively, the alert on message could be a standard ring or even another type of alerting technique such as the sending of an email or page to the user.

Next, the ACD controller 42 monitors for an indication that the user has answered the alert on message at step 188. This answering of the alert on message is preferably done by the user picking up the receiver corresponding to the remote telephone station 48, though in alternative embodiments this could be done in a different manner such as pressing a softkey. If the user does not answer the alert on message, the ACD controller 42 determines if an answer timeout period has expired at step 190, the expiration of the answer timeout period resulting in the termination of the telephone call between the ACD controller 42 and the remote telephone station 48. If the answer timeout period is not expired, the ACD controller 42 continues to monitor for an answer to the alert on message at step 188.

If the user answers the alert on message at step 188, the ACD controller 42 proceeds with the connection of the telephone call with the attendant as previously described at steps 132 and 134.

It is noted that, when operating within an alert mode of operation, the remote telephone station 48, according to preferred embodiments of the present invention, is a wireless telephone station such as the remote telephone station of FIG. 2 which communicates with the IP network 40 via the base station 52. This embodiment allows for the most flexibility for the user since he/she can continue to do other things while waiting for the attendant to answer his/her call as long as the user carries the wireless telephone. In this embodiment, data messages are sent between the wireless telephone station 48 and the base station 52 along existing data communication channels in order to enable the operations described herein for the preferred embodiments.

FIG. 9 is a flow chart illustrating the steps performed by the ACD controller 42 during the browser request softkey operation 152 according to preferred embodiments of the present invention. First within this procedure, the ACD controller 42 sets itself into browser mode at step 200, the browser mode including initiating web server software within the processor 92. Alternatively, the browser mode could entail the establishment of an Internet and/or Intranet connection with an external web server.

Next, at step 202, the ACD controller 42 proceeds to run an HTTP session with browser software running in the remote telephone station 48 including sending specific web page information stored in the hard disk 88 of the ACD controller 42 to the remote telephone station 48. In this implementation, the processor 92 acts as the web server for the remote telephone station 48, sending and accepting data to/from the remote telephone station 48. This HTTP session could allow the user to browse through data information related to the corporation corresponding to the ACD system. In some embodiments the browser session entails browsing through a corporation's web page and/or the Internet.

While the browser session is taking place, the ACD controller 42 continues to monitor for an available attendant at step 204. Once an attendant is available, the ACD controller 42 sends an audible alert signal to the remote telephone station 48 which triggers an audible alert that the call is being forwarded to an attendant. Next, the ACD controller 42 proceeds to connect the remote telephone station 42 to the attendant with use of steps 132 and 134 as described previously. Once connected with the remote telephone station 48, the ACD controller 42 preferably sends the browser information the user was last viewing to the console 46 corresponding to the attendant in which the call was forwarded to. This forwarding of the browser information preferably being done by the processor 92 establishing an identical browser session with the console 46 corresponding to the appropriate attendant and relaying any user input to the attendant. In this manner, both the attendant and the user of the remote telephone station 48 can share and manipulate the same browser information.

The above description is specific to preferred embodiments of the present invention. It is recognized that alternative embodiments are possible while staying, within the scope of the present invention. In particular, not all of the steps of FIGS. 6, 7, 8 and 9 are required within embodiments of the present invention. For instance, some alternative embodiments enable only one or two of the music request softkey operation 148, the alert request softkey operation 150 and the browser request softkey operation 152. In fact, in some alternative embodiments, none of these operations 148,150,152 are enabled and the ACD controller 42 only provides waiting parameter information to the user. Further alternatives, do not use softkeys as a user interface but rather use other techniques for the user to select between a number of options such as hard wired keys, DTMF keys, voice recognition software, mouse clicks and/or keyboard commands. In the case of DTMF keys or voice recognition software, it should be understood that the DSP card 86 can perform voice codec algorithms to retrieve the unencoded voice and/or perform digital filtering on the audio channel in order to retrieve the DTMF information. In the case of voice recognition being used, a further voice recognition software must be run within the ACD controller 42, preferably on the processor 92.

As mentioned previously, the ACD controller 42 could equally be implemented within the ACD system of FIG. 3 which includes an ACD LAN 56. The key difference required in this alternative is simply that all communications between the ACD controller 42 and the remote telephone stations 48 and communications between the attendant telephone stations 44 and the remote telephone stations 48 must traverse the interface between the ACD LAN 56 and the IP network 40. As described previously, this interface in preferred embodiments is a router or firewall device.

Yet further alternative embodiments provide a different structure to the overall call reception operation of FIG. 6. In one such alternative embodiment, a user calling the ACD system is initially entered into an operation similar to the browser request softkey operation 152 no matter if an attendant is available or not. This could possibly allow the user to acquire the information needed without the need of an attendant and/or allow the attendant to monitor the user's selections while in the browser session to determine a strategy for dealing with the particular user. In this alternative embodiment, the user of the remote telephone station 48 might only be connected to an attendant if he/she sends an attendant request message to the ACD controller 42.

In even further embodiments of the present invention, the ACD controller 42 could further be used to provide a variety of other options such as stock quotes, advertising, games, etc. while the user is waiting for an attendant.

Figure 1:
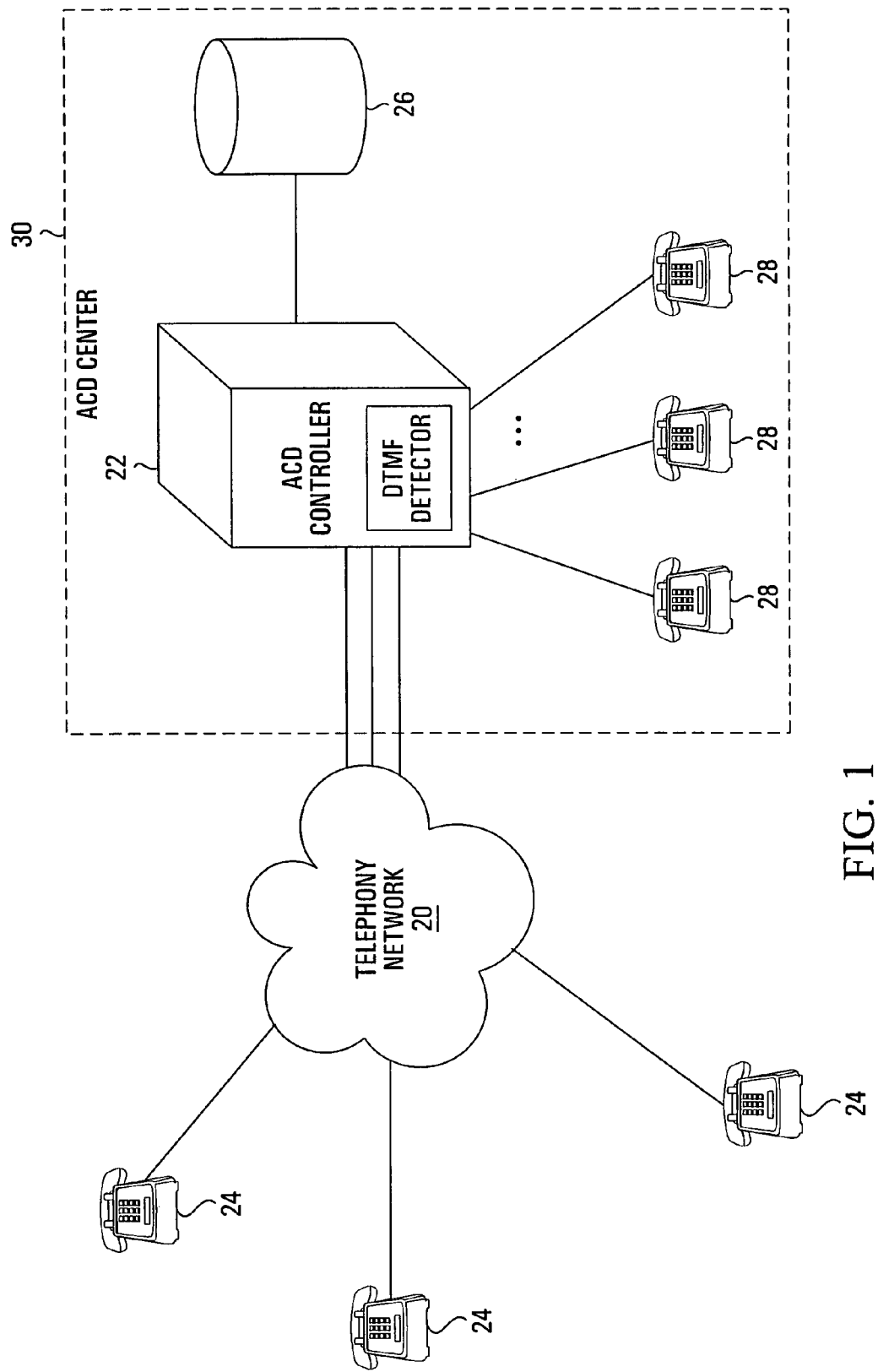
FIG. 1 is a high level block diagram of a standard telephony network coupled to an ACD system.
Figure 10:
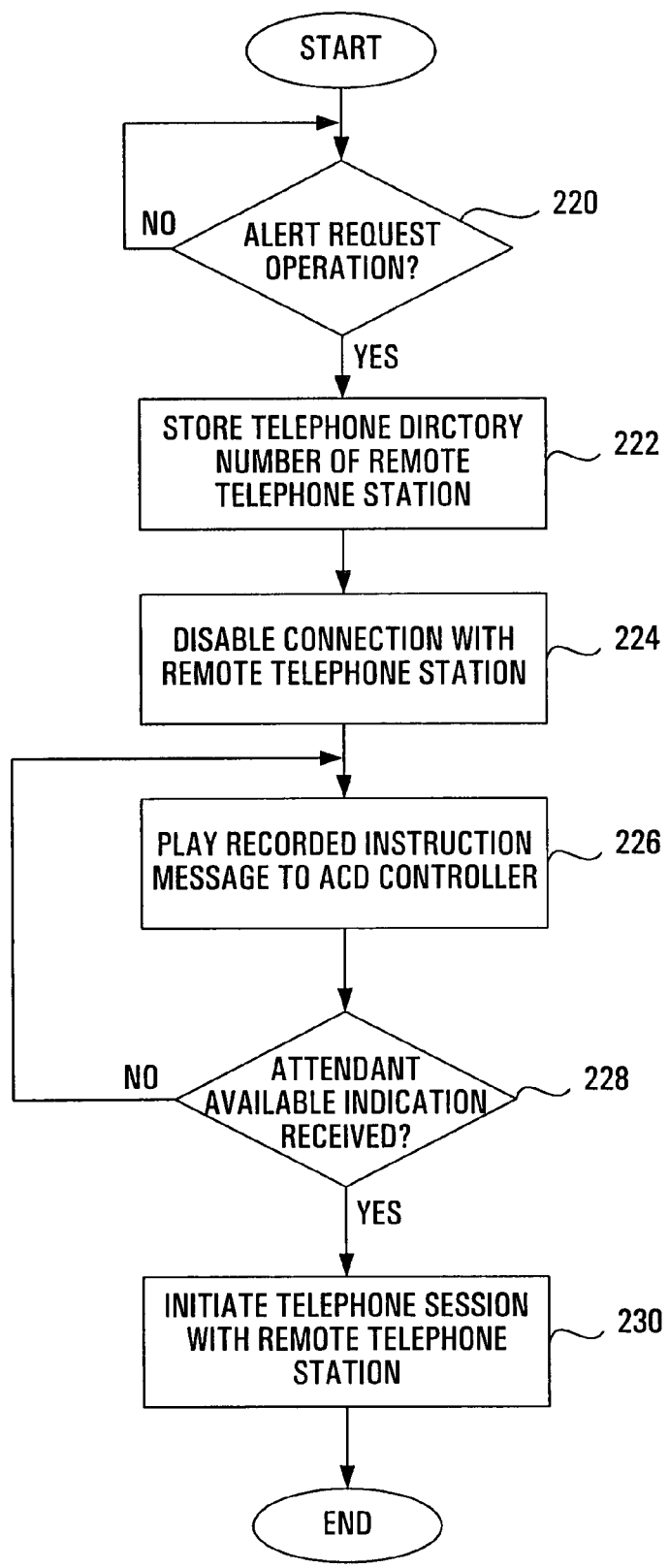
FIG. 10 is a flow chart illustrating the steps performed by a switch device according to an embodiment of the present invention during an alert request operation.

All of the embodiments of the present invention described above are implemented with use of a packet-based network, that preferably being the IP network 40. In a further embodiment of the present invention, a standard analog network is utilized similar to that illustrated within FIG. 1. In this embodiment, an alert request operation is capable of being implemented within a switch device (not shown) within the analog telephone network 20 or alternatively within the ACD controller 22 or yet alternatively within the remote telephone station 24 itself. FIG. 10 is a flow chart illustrating the steps performed by the switch device according to this embodiment during an alert request operation. It should be understood that similar steps to those described below would be required if the alert request operation was implemented within the ACD controller 22. Modifications required if the alert request operation of FIG. 10 was implemented within the remote telephone station 24 is described after the description of FIG. 10.

Firstly, a telephone session is initiated with the ACD controller 22 by one of the remote telephone stations 24. If the user is notified that he/she will have to wait to be connected with an attendant, the user could, at this point, press a specific DTMF code that indicates to the switch device to perform the alert request operation. Preferably, the DTMF code is a "*" key followed by a predetermined digital code. As depicted in FIG. 10, the first step in the operation within the switch device is to monitor for the enabling of the alert request operation at step 220. Next, the switch device determines and stores the telephone directory number corresponding to the remote telephone station 24 at step 222 and disables the connection between the remote telephone station 24 and the ACD controller 22 at step 224, the connection remaining between the ACD controller 22 and the switch device. At this point, the user of the remote telephone station 24 can answer/initiate other telephone sessions that would not have been possible if still connected to the ACD system.

Subsequently, the switch device operates to play a recorded instruction message to the ACD controller 22 at step 226. This instruction message in one preferable embodiment states "Please press the pound key when an attendant is available". In this case, if the call is transferred to an attendant, the attendant will hear this recording and will presumably press the "#" key when ready to answer the call, the pressing of the "#" key generally being referred to as an attendant available indication. As depicted at step 228, the switch device will operate to monitor for an attendant available indication at step 228. If no such indication is detected, the switch device returns to step 226 and replays the recorded instruction message. Once the switch device detects an attendant available indication at step 228, the switch device proceeds to initiate a telephone session with the remote telephone station 24 at step 230. This initiation preferably includes sending a ring tone that is unique for this particular operation so that the user understands that an attendant is available. Once the user has answered the ring tone, the switch device connects the call as if the remote telephone station 24 was connected to the ACD controller 22 the entire waiting period.

In an alternative embodiment, rather than performing steps 226 and 228, the switch device monitors for a ring back which is typically generated when a telephone session is transferred. In this case, a ring back indicates that the call is being transferred to an attendant. Therefore, when a ring back is detected, the switch device proceeds with step 230 described previously.

In the case that the alert request operation of FIG. 10 is performed by the remote telephone station 24 itself, there are a couple of key modifications. Essentially, the algorithm of FIG. 10 is identical but with steps 222 and 224 removed and step 230 only including the ringing of the telephone station 24 and not the re-initiation of the telephone session. In this case, the connection is maintained between the remote telephone station 24 and the ACD controller 22, and so the telephone station 24 cannot initiate/accept other telephone sessions while waiting for the attendant. There is still the advantage of not having to wait immediately next to the remote telephone station 24 in this case due to the telephone station 24 ringing when the attendant is available.

There are a large number of advantages to the embodiments of the present invention as described herein above. One key advantage of these embodiments is with respect to the incredible amount of flexibility given to a person calling a ACD system. The person calling the ACD system preferably is provided an estimated waiting time, a selection of music, a possible alert indication when an attendant is available and the ability to browse for information while waiting. These capabilities will decrease the frustrations felt by people attempting to contact an attendant by making the waiting period more pleasant.

Persons skilled in the art will appreciate that there are yet more alternative implementations and modifications possible for implementing the present invention, and that the above implementations are only illustrations of certain embodiments of the invention. The scope of the invention, therefore, is only to be limited by the claims appended hereto.

I claim:

1. An Automatic Call Distribution (ACD) controller arranged to be coupled through at least one packet-based network to a plurality of remote telephone stations and one or more attendant telephone stations, the ACD controller comprising:

call reception logic that controls the establishment of telephone sessions between the remote telephone stations and the one or more attendant telephone stations;

wherein the call reception logic operates to:
  receive one or more data packets including call initiation signals from a particular one of the remote telephone stations,
  monitor if an attendant availability parameter is met; if the attendant availability parameter is not met, to send at least one data information message within one or more data packets to the particular remote telephone station via the at least one packet-based network; and, if the attendant availability parameter is met, to establish an audio channel between the particular remote telephone station and a particular one of the attendant telephone stations, wherein the data information message comprises an alert request option,
  monitor for receipt of one or more data packets including an alert request activation message from the particular remote telephone station in response to the alert request option; and, if the call reception logic receives the alert request activation message from the particular remote telephone station, to send an alert message within one or more data packets to the particular remote telephone station when the attendant availability parameter is met, and
  send an alert mode message within one or more data packets to the particular remote telephone station if the call reception logic receives the alert request activation message from the particular remote telephone station, the alert mode message enabling an alert mode icon to be displayed on the display of the particular remote telephone station, wherein the alert mode icon indicates to a user the remote telephone station is in alert mode and can proceed with normal operations.

2. An ACD controller in accordance with claim 1, wherein the call reception logic further operates to periodically determine a waiting parameter prior to the attendant availability parameter being met and to periodically send a data information message within one or more data packets comprising the waiting parameter to the particular remote telephone station.

3. An ACD controller in accordance with claim 1, wherein the alert message comprises a ring request for the particular remote telephone station.

4. An ACD controller in accordance with claim 3, wherein the ring request comprises a volume request to ensure a ring volume selection corresponding to the particular remote telephone station is at a sufficiently high level.

5. An ACD controller in accordance with claim 1, wherein the alert message comprises an email message being sent to an email account corresponding to the particular remote telephone station.

6. An ACD controller in accordance with claim 1, wherein the alert request option comprises a text string to be displayed on a display screen associated with the particular remote telephone station, the text string indicating to a user of the particular remote telephone station how to send an alert request activation message to the call reception logic.

7. An ACD controller in accordance with claim 1, wherein the call reception logic further operates to query the capabilities of the particular remote telephone station prior to sending the data information message, a format for the data information message being determined based upon the capabilities of the particular remote telephone station.

8. An ACD controller in accordance with claim 1, wherein the call reception logic further operates to send control signals within one or more data packets to the particular remote telephone station indicating the ACD controller will control a user interface comprising a display screen within the particular remote telephone station.

9. An ACD controller in accordance with claim 8, wherein the user interface of the particular remote station further comprises softkeys.

10. An ACD controller in accordance with claim 8, wherein the at least one packet-based network is an Internet Protocol (IP) network and the data information message is transmitted within an IP packet.

11. An ACD controller in accordance with claim 1, wherein the call reception logic further operates to:
  when the alert request activation signal is received, storing a directory number corresponding to the remote telephone station; disconnecting the particular remote telephone station from the ACD controller; monitoring for an attendant ready signal from the ACD controller; and, if the attendant ready signal is received, initiating a telephone session with the particular remote telephone station using the stored directory number in order to connect the particular remote telephone station and a one of the attendant telephone stations.

12. An Automatic Call Distribution (ACD) center comprising:
  one or more attendant telephone stations;
  an ACD controller arranged to be coupled through at least one packet-based network to a plurality of remote telephone stations and the one or more attendant telephone stations, the ACD controller comprising call reception logic that controls the establishment of telephone sessions between the remote telephone stations and the attendant telephone stations,
  wherein the call reception logic operates to:
    receive one or more data packets including call initiation signals from a particular one of the remote telephone stations,
    monitor if an attendant availability parameter is met; if the attendant availability parameter is not met, to send at least one data information message within one or more data packets to the particular remote telephone station via the at least one packet-based network; and, if the attendant availability parameter is met, to establish an audio channel between the particular remote telephone station and a particular one of the attendant telephone stations, wherein the data information message comprises an alert request option,
    monitor for receipt of one or more data packets including an alert request activation message from the particular remote telephone station in response to the alert request option; and, if the call reception logic receives the alert request activation message from the particular remote telephone station, to send an alert message within one or more data packets to the particular remote telephone station when the attendant availability parameter is met, and
    send an alert mode message within one or more data packets to the particular remote telephone station if the call reception logic receives the alert request activation message from the particular remote telephone station, the alert mode message enabling an alert mode icon to be displayed on the display of the particular remote telephone station, wherein the alert mode icon indicates to a user the remote telephone station is in alert mode and can proceed with normal operations.

13. An ACD system in accordance with claim 12, wherein the alert message comprises a ring request for the particular remote telephone station.

14. An ACD system in accordance with claim 13, wherein the ring request comprises a volume request to ensure a ring volume selection corresponding to the particular remote telephone station is at a sufficiently high level.

15. An ACD system in accordance with claim 12, wherein the call reception logic further operates to:
when the alert request activation signal is received, storing a directory number corresponding to the remote telephone station; disconnecting the particular remote telephone station from the ACD controller; monitoring for an attendant ready signal from the ACD controller; and, if the attendant ready signal is received, initiating a telephone session with the particular remote telephone station using the stored directory number in order to connect the particular remote telephone station and a one of the attendant telephone stations.

16. A method of operating an Automatic Call Distribution (ACD) controller arranged to be coupled through at least one packet-based network to a plurality of remote telephone stations and one or more attendant telephone stations, the method comprising:
controlling establishment of telephone sessions between the remote telephone stations and the one or more attendant telephone stations by:
receiving one or more data packets including call initiation signals from a particular one of the remote telephone stations;
monitoring if an attendant availability parameter is met; if the attendant availability parameter is not met, sending at least one data information message within one or more data packets to the particular remote telephone station via the at least one packet-based network; and, if the attendant availability parameter is met, establishing an audio channel between the particular remote telephone station and a particular one of the attendant telephone stations, wherein the data information message comprises an alert request option;
monitoring for receipt of one or more data packets including an alert request activation message from the particular remote telephone station in response to the alert request option; and, if the call reception logic receives the alert request activation message from the particular remote telephone station, sending an alert message within one or more data packets to the particular remote telephone station when the attendant availability parameter is met; and
sending an alert mode message within one or more data packets to the particular remote telephone station if the call reception logic receives the alert request activation message from the particular remote telephone station, the alert mode message enabling an alert mode icon to be displayed on the display of the particular remote telephone station, wherein the alert mode icon indicates to a user the remote telephone station is in alert mode and can proceed with normal operations.

* * * * *

UNITED STATES PATENT AND TRADEMARK OFFICE
CERTIFICATE OF CORRECTION

PATENT NO.        : 7,885,400 B2
APPLICATION NO.   : 11/827142
DATED             : February 8, 2011
INVENTOR(S)       : Michael C. G. Lee Page 1 of 1

It is certified that error appears in the above-identified patent and that said Letters Patent is hereby corrected as shown below:

On the title page, at Item "(73) Assignee:" delete "Mortel Networks Limited" and insert -- Nortel Networks Limited --.

Signed and Sealed this
Twenty-first Day of June, 2011

David J. Kappos
*Director of the United States Patent and Trademark Office*